Patented Dec. 4, 1928.

1,693,915

UNITED STATES PATENT OFFICE.

JOHANNES BRODE AND ADOLF JOHANNSEN, OF LUDWIGSHAFEN-ON-THE-RHINE, GERMANY, ASSIGNORS TO GRASSELLI DYESTUFF CORPORATION, OF NEW YORK, N. Y., A CORPORATION OF DELAWARE.

CARRYING OUT CATALYTIC OXIDATIONS IN THE GASEOUS OR VAPOR STATE.

No Drawing. Application filed April 25, 1927, Serial No. 186,565, and in Germany June 14, 1926.

In the catalytic oxidation of organic substances in the gaseous or vapor state the reaction products are usually recovered in a solid or liquid condition by cooling the resulting reaction mixtures. It frequently happens according to this method of working, and especially when impure initial materials are used, that the separated reaction products are contaminated by by-products, and it is often impossible to make use of such contaminated products without previous purification. Thus, for example, when using technical naphthalene products in the catalytic production of phthalic anhydride according to the methods previously known, a grey product of imperfect purity is obtained.

We have now found that pure, or practically pure, products may be obtained in the catalytic oxidation of organic compounds in the vapor state, by bringing the reaction mixture, coming from the reaction chamber, into contact with solid substances, prior to the separation of the reaction products. The action of the solid substances is probably due to a kind of selective adsorption, but we do not wish to bind ourselves to this explanation of the result obtained. Generally speaking such solid substances as have a large superficial area, for example, granulated pumice, earthenware sherds, silica gel, active carbon, and the like, are most suitable, but other materials which may have a surface only slightly rough or even smooth, for example marble, calamine (zinc carbonate) or iron turnings or the like, give also good results. In any case the solid substances must be so chosen, that they do not alter their shape at the temperature of use, that means that they do not melt or volatilize, and that they do not react with the desired reaction products and are not decomposed by the hot gases with the formation of products which would react with or contaminate the desired reaction product. Thus for example calamine may be employed even at temperatures at which carbon dioxid is split off, whereas for example peat though it possesses a rather large superficial area, is unsuitable in most cases, as it would give off organic decomposition products contaminating the desired reaction product at the temperature of working. In many instances the action of the said substances and the time for which they remain active, may be improved by impregnating them, prior to use, with solutions of salts or bases, or by coating them with salts or metallic oxids.

The temperature at which the solid substances are allowed to act must be maintained high enough as to avoid deposition of the desired reaction product. In most cases they will range about 50° C. above the temperature at which the desired reaction product would separate out, but they may also be much higher, for example as high as those prevailing in the catalytic oxidation. In some cases, however, especially when working with substances impregnated or coated with metallic oxids, it may be necessary to lower the temperature of the reaction mixture to such an extent as to preclude any appreciable alteration of the reaction product itself by reason of a catalytic action of the solid substances, which may lead for example to further oxidation or to the splitting off of carbon dioxid. The most suitable temperatures vary with the nature of the solid substances and can easily be ascertained.

Inasmuch as a gradual diminution of the purifying action of the said solid substances occurs in protracted use, it is advisable to apply them in the following manner, namely to bring the reaction gases at first into contact with partially spent solid substances and thereafter into contact with such as are still efficient or fresh. A preferred method is to bring the said solid substances continuously into contact with the reaction mixture, on the counter-flow principle. This may be effected, for example, by passing the reaction mixture up through a shaft filled with the said solid substances and provided at the top and bottom with suitable devices, such as air-locks, by means of which the spent substances can be removed at the bottom and replaced by fresh or regenerated solid substances introduced at the top, without interrupting the continuity of the operation.

The following example will further illustrate how our invention may be carried out in practice, but the invention is not limited thereto.

*Example.*

Commercial naphthalene is catalytically oxidized in the known manner and the resulting gas mixture in which phthalic anhydride is present with a partial pressure of about 3.5 millimetres mercury, is subjected to the above-described treatment prior to the separation of the phthalic anhydride, by passing it, at about 200° C., over granulated pumice or bauxite. The bulk of the product obtained on cooling is perfectly white and contains more than 99 per cent of phthalic anhydride. A special advantage of the process according to the present invention consists in the fact that when sulfur-contaminated technical grades of naphthalene are used, the sulfuric acid formed during the oxidation is retained by the purifying mass, and phthalic anhydride free from sulfuric acid is obtained direct.

If the oxidation of the naphthalene be conducted in such a way that large amounts of naphthoquinone are contained in the reaction mixture besides phthalic anhydride, the cooled separated product obtained after treating the said mixture with the said solid substances, for example, with granulated pumice, at about 200° C., consists of a pure yellow mixture of phthalic anhydride and naphthoquinone, from which the pure naphthoquinone can easily be recovered, for instance by extracting the phthalic anhydride with weak alkalis, whereas in the absence of a treatment with solid substances, a large portion of the naphthoquinone undergoes conversion, and a valueless dark-colored product is deposited.

The said process may also be employed, as in the case of the oxidation of naphthalene, in connection with other catalytic oxidations in the gaseous state, such for example as the preparation of maleic anhydride and benzoquinone from benzene and its derivatives and the production of benzaldehyde and benzoic acid from toluene. It affords special advantages when sulfur-containing initial products, such as commercial benzene, phenol or toluene, are used.

What we claim is:

1. In the catalytic oxidation of organic compounds, the step of bringing the gaseous mixture having undergone the reaction, prior to the separation of the reaction products and at a temperature at which no deposition of the desired reaction product occurs, into contact with a solid substance not altering its shape at the temperature of use and not giving rise to further conversion and contamination of the desired reaction product, and capable of removing impurities from the reaction mixture.

2. In the catalytic oxidation of organic compounds, the step of bringing the gaseous mixture having undergone the reaction, prior to the separation of the reaction products and at a temperature at which no deposition of the desired reaction product occurs, into contact with a solid substance not altering its shape at the temperature of use, not giving rise to further conversion and contamination of the desired reaction product, and capable of removing impurities from the reaction mixture and having a large superficial area.

3. In the catalytic oxidation of organic compounds, the step of bringing the gaseous mixture having undergone the reaction prior to the separation of the reaction products and at a temperature at which no deposition of the desired reaction product occurs, into contact with a partially spent solid substance not altering its shape at the temperature of use and not giving rise to further conversion and contamination of the desired reaction product, and capable of removing impurities from the reaction mixture, and then with a fresh substance of the said kind.

4. In the catalytic oxidation of organic compounds, the step of bringing the gaseous mixture having undergone the reaction prior to the separation of the reaction products and at a temperature at which no deposition of the desired reaction product occurs, into contact, on the counterflow principle, with a solid substance not altering its shape at the temperature of use and not giving rise to further conversion and contamination of the desired reaction products.

5. In the catalytic oxidation of naphthalene, the step of bringing the gaseous mixture having undergone the reaction, prior to the separation of the reaction products and between about 150° and 250° C., into contact with a solid substance not altering its shape at the temperature of use and not giving rise to further conversion and contamination of the desired reaction product, and capable of removing impurities from the reaction mixture.

6. In the catalytic oxidation of naphthalene, the step of bringing the gaseous mixture having undergone the reaction, prior to the separation of the reaction products and at about 200° C., into contact with granulated pumice.

In testimony whereof we have hereunto set our hands.

JOHANNES BRODE.
ADOLF JOHANNSEN.

CERTIFICATE OF CORRECTION.

Patent No. 1,693,915.  Granted December 4, 1928, to

JOHANNES BRODE ET AL.

It is hereby certified that error appears in the printed specification of the above numbered patent requiring correction as follows: Page 2, line 92, after the word "products" and before the period insert the comma and words ", and capable of removing impurities from the reaction mixture"; and that the said Letters Patent should be read with this correction therein that the same may conform to the record of the case in the Patent Office.

Signed and sealed this 15th day of January, A. D. 1929.

(Seal)

M. J. Moore,
Acting Commissioner of Patents.